July 7, 1942.  F. E. VALENTINE  2,288,859

SLIP HANDWHEEL

Filed Jan. 31, 1941

Inventor:
Frank E. Valentine,
by *Harry E. Dunham*
His Attorney.

Patented July 7, 1942

2,288,859

UNITED STATES PATENT OFFICE 2,288,859

SLIP HANDWHEEL

Frank E. Valentine, Schenectady, N. Y., assignor to General Electric Company, a corporation of New York Application January 31, 1941, Serial No. 376,829

4 Claims. (Cl. 74—549)

This invention relates to slip handwheels that are provided to drive a normal load, but will slip so as to protect the driven equipment, when a force greater than normal is applied to overcome an abnormal resistance to movement of the equipment, or a normal force applied too quickly, and it has for its object the provision of an improved device of this character, which is simple in its construction, inexpensive to manufacture, and efficient in its operation.

This invention is especially applicable to calculating devices and the like where delicate and expensive mechanisms are driven by the handwheel, and it contemplates an improved handwheel structure which insures slip of the wheel under the conditions mentioned above in order to protect the mechanism against injury.

In accordance with this invention in one form thereof, a member is rigidly secured to the driven member, and a second manually operable member is free to move with reference to the driven member. Friction shoes are provided for frictionally engaging the manually operable member. These shoes are mounted upon a suitable spring member which is carried by the first member so as to be biased into frictional engagement with the manually operable member. Normally, the friction shoes provide a driving connection between the manually operable member and the first member, and hence, with the driven member. However, should a force greater than normal be applied to overcome an abnormal resistance, or should a normal force be applied too quickly, the friction shoes will slip so as to permit the manually operable member to slip with reference to the driven member.

Figure 1:
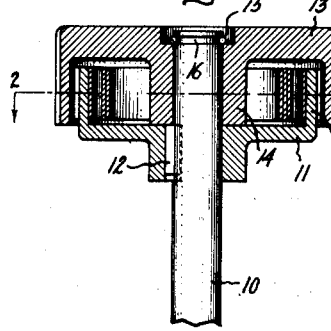
Figure 2:
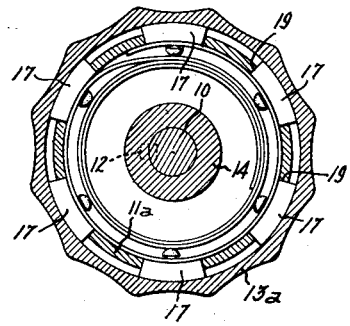
Figure 3:
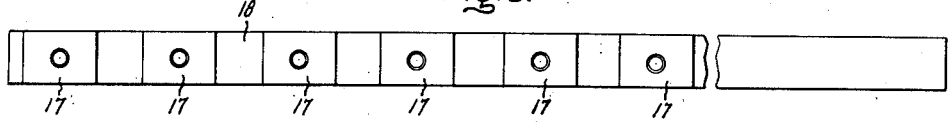
Figure 4:
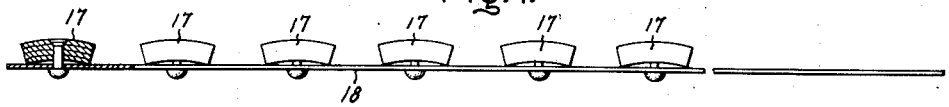
Figure 5:
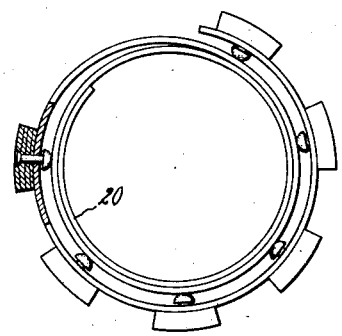

For a more complete understanding of this invention, reference should be had to the accompanying drawing in which Fig. 1 is a vertical sectional view of a handwheel structure arranged in accordance with this invention; Fig. 2 is a horizontal sectional view of parts of the structure of Fig. 1 taken through the line 2—2 of Fig. 1 and looking in the direction of the arrows; Fig. 3 is a fragmentary view in elevation of a plurality of friction shoes used in the handwheel structure of Figs. 1 and 2, and also showing the spring member that mounts the shoes; Fig. 4 is a fragmentary side elevation of the assembly shown in Fig. 3; and Fig. 5 is a friction shoe and spring assembly of modified form arranged in accordance with this invention.

Referring to the drawing, this invention has been shown in one form as applied to a handwheel structure used to drive a shaft 10 of a calculating mechanism (not shown).

The handwheel structure arranged in accordance with this invention comprises a cup-shaped member 11 which is rigidly secured to the shaft 10 by means of a key 12. The key 12 prevents the member 11 from moving axially with relation to the shaft as well as preventing it from rotating relative to the shaft.

A second cup-shaped member 13 is provided. This member is arranged in inverted relation with reference to the member 11, and receives this member within it, as shown. The side wall 13a of the member 13 is somewhat larger in diameter than the side wall 11a of the first member 11 so that the two walls are in spaced-apart, concentric relation, as shown in Figs. 1 and 2. The member 13 is mounted on the shaft so that it may rotate freely with reference to it by means of a bearing 14. This bearing engages the bottom wall of the cup 11 to prevent axial movement of the cup 13 in one direction, and is prevented from moving axially in the other direction by means of a split ring 15 fitted in a circular recess 16 in the end of the shaft, as shown.

A driving connection is effected between the member 13 and the member 11 by means of a plurality of friction shoes 17 which preferably will have some non-circular form, such as a rectangular form, as shown. These shoes may be formed of any suitable material, such as a molded brake lining material. The shoes are loosely mounted in spaced relation upon a suitable initially flat band-like spring 18. This may be accomplished in any suitable manner as by loosely riveting the shoes to the spring. The side wall 11a is provided with a plurality of spaced openings 19 corresponding in spacing and in shape to the spacing and shape of the shoes 17, and the band-like support 18 is fitted in the cup member 11 so that the shoes project outwardly through the openings 19 and into engagement with the inner surface of the side wall 13a of the cup member 13. The openings are somewhat larger than are the shoes so that the shoes can move freely within the openings so that they can properly seat themselves against the wall 13a. It will be understood that the spring forces the shoes outwardly with a predetermined force so as to effect a driving connection between the cup 13 and the cup 11. The spring is elongated and wound spirally, as shown. The amount of force is determined by the number of turns of the spring.

It will be understood that in the operation of the device, the member 13 will be used as a manually operated knob to drive the shaft 10. As long as a normal force is applied to the shaft 10 at a normal speed, the friction shoes will transmit the movement of the knob 13 to the shaft 10. However, if an abnormal force be applied to the knob 13, in order to overcome an abnormal resistance to movement of the shaft, or a normal force applied too quickly, the friction shoes will slip permitting the knob to rotate without rotating the shaft 10. This protects the mechanism driven by the shaft 10 from injury.

In the form of the spring mounting shown in Fig. 5, a preformed curved supporting band spring 20 will be used rather than the initial flat spring 18 of the form of Figs. 1 to 4. It is preferable to use the preformed circular spring of Fig. 5 when used in a mechanism requiring a comparatively great force to drive it.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. Handwheel structure for driving a shaft comprising a first member rigidly secured to said shaft having a flange, a second, hand-grasping member freely rotatable on said shaft and having a flange opposite the flange on said first member, said latter flange having a series of spaced openings therein, and a spring supporting a series of spaced friction shoes on said first member biasing said shoes through said openings into frictional engagement with the flange on said second member.

2. Handwheel structure for driving a rotatable shaft comprising a pair of circular cup-shaped members arranged in inverted relation to each other and one received within the other so that their side walls are in spaced concentric relation, means keying the first of said members to said shaft so that it is prevented from moving axially on the shaft and also from rotating with reference to it, the second of said members being free to rotate on said shaft, means preventing said second member from moving axially on said shaft, the side wall of said first member having a series of spaced rectangular apertures therethrough, a series of spaced rectangular shoes mounted in said apertures, and a band spring in said first member loosely attached to said shoes and biasing them into frictional engagement with the side wall of said second member.

3. Handwheel structure for driving a rotatable shaft comprising a pair of circular cup-shaped members arranged in inverted relation to each other and one received within the other so that their side walls are in spaced concentric relation, means keying said one member to the shaft to prevent relative axial and rotary movement of said member with relation to the shaft, said other member having a bearing freely rotatable on said shaft and engaging the bottom wall of the first member to prevent axial movement of the other member in one direction, means attached to the shaft preventing axial movement of said other member in the other direction, the side wall of said one member having a series of circumferentially spaced non-circular openings therethrough, correspondingly shaped friction shoes in said openings, and spring means biasing said shoes outwardly into frictional engagement with the side wall of said other member.

4. Handwheel structure for driving a rotatable shaft comprising a pair of circular cup-shaped members arranged in inverted relation to each other and one received within the other so that their side walls are in spaced concentric relation, means securing the first of said members to said shaft so as to prevent relative axial and rotary movement of said member with relation to the shaft, the second of said members being free to rotate on said shaft, means preventing said second member from moving axially on said shaft, the side wall of said first member having a series of spaced apertures therethrough, a series of spaced shoes mounted in said apertures, and a spirally wound spring in said first member loosely attached to said shoes and biasing them into frictional engagement with the side wall of said second member.

FRANK E. VALENTINE.